(12) United States Patent
Durr

(10) Patent No.: US 9,259,981 B2
(45) Date of Patent: Feb. 16, 2016

(54) VALVE STEM-BASED PRESSURE REGULATOR SYSTEM FOR AN AIR MAINTENANCE TIRE AND METHOD

(71) Applicant: The Goodyear Tire & Rubber Company, Akron, OH (US)

(72) Inventor: Michael Joseph Durr, Strongsville, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 190 days.

(21) Appl. No.: 14/071,901

(22) Filed: Nov. 5, 2013

(65) Prior Publication Data

US 2015/0122389 A1 May 7, 2015

(51) Int. Cl.
*B60C 23/12* (2006.01)
*B29D 30/00* (2006.01)

(52) U.S. Cl.
CPC .......... *B60C 23/12* (2013.01); *B29D 30/0061* (2013.01); *Y10T 152/10495* (2015.01)

(58) Field of Classification Search
CPC ............................... B60C 23/12; B60C 23/14
USPC ............................ 152/450, 426, 419, 427, 539
See application file for complete search history.

(56) References Cited

U.S. PATENT DOCUMENTS

| | | | |
|---|---|---|---|
| 1,050,886 A | 1/1913 | Wetherell | |
| 1,134,361 A | 4/1915 | Wetherell | |
| 1,682,922 A | 9/1928 | McKone | |
| 3,304,981 A | 2/1967 | Sheppard | |
| 3,833,041 A | 9/1974 | Glad et al. | 152/347 |
| 4,922,984 A | 5/1990 | Dosjoub et al. | 152/415 |
| 5,052,456 A | 10/1991 | Dosjoub | 152/415 |
| 5,694,969 A * | 12/1997 | DeVuyst | 152/427 |
| 7,117,731 B2 | 10/2006 | Hrabal | 73/146 |
| 8,042,586 B2 | 10/2011 | Losey et al. | 152/426 |
| 8,113,254 B2 * | 2/2012 | Benedict | 152/426 |
| 8,132,607 B2 | 3/2012 | Kusunoki et al. | |
| 8,534,335 B2 * | 9/2013 | Benedict | 152/426 |
| 8,550,137 B2 * | 10/2013 | Delgado et al. | 152/539 |
| 8,746,306 B2 * | 6/2014 | Hinque et al. | 152/426 |
| 8,763,661 B2 * | 7/2014 | Richardson | 152/419 |
| 8,955,567 B2 * | 2/2015 | Hinque et al. | 152/450 |

(Continued)

FOREIGN PATENT DOCUMENTS

| | | | |
|---|---|---|---|
| DE | 3433318 | 3/1986 | B60C 23/12 |
| DE | 3433318 A1 | 3/1986 | |

(Continued)

OTHER PUBLICATIONS

European Search Report received Mar. 12, 2015.

*Primary Examiner* — Hau Phan
(74) *Attorney, Agent, or Firm* — Richard B. O'Planick

(57) ABSTRACT

An air maintenance tire assembly and method of operation includes a pressurized air supply assembly for supplying pressurized air to a tire cavity through an elongate outward projecting, valve stem passageway. An elongate centrally disposed shaft within the valve stem reciprocally moves axially in the valve stem internal air passageway between a passageway-opening axial position and a passageway-closing axial position. A pressure regulator is provided to move the elongate shaft axially between the passageway-opening and passageway-closing positions responsive to a detected air pressure level within the tire cavity.

12 Claims, 16 Drawing Sheets

(56) References Cited

U.S. PATENT DOCUMENTS

| | | | |
|---|---|---|---|
| 8,985,171 B2* | 3/2015 | Hinque et al. | 152/548 |
| 9,045,005 B2* | 6/2015 | Gobinath et al. | |
| 2009/0294006 A1 | 12/2009 | Hrabal | 152/426 |
| 2010/0243121 A1* | 9/2010 | Eigenbrode | 152/419 |
| 2012/0305126 A1* | 12/2012 | Merrill | 141/1 |
| 2014/0000778 A1* | 1/2014 | Gobinath | 152/450 |
| 2014/0158267 A1* | 6/2014 | Gobinath et al. | 152/450 |

FOREIGN PATENT DOCUMENTS

| | | | |
|---|---|---|---|
| DE | 3729326 A1 | 3/1989 | |
| RU | 2106978 | 3/1998 | B60C 23/12 |
| SE | 183890 | 5/1963 | |
| WO | 03/049958 | 6/2003 | B60C 23/12 |
| WO | 2005/012009 | 2/2005 | B60C 23/00 |
| WO | 2007/134556 | 11/2007 | B60C 15/024 |
| WO | 2010/008338 | 1/2010 | B60C 23/00 |

* cited by examiner

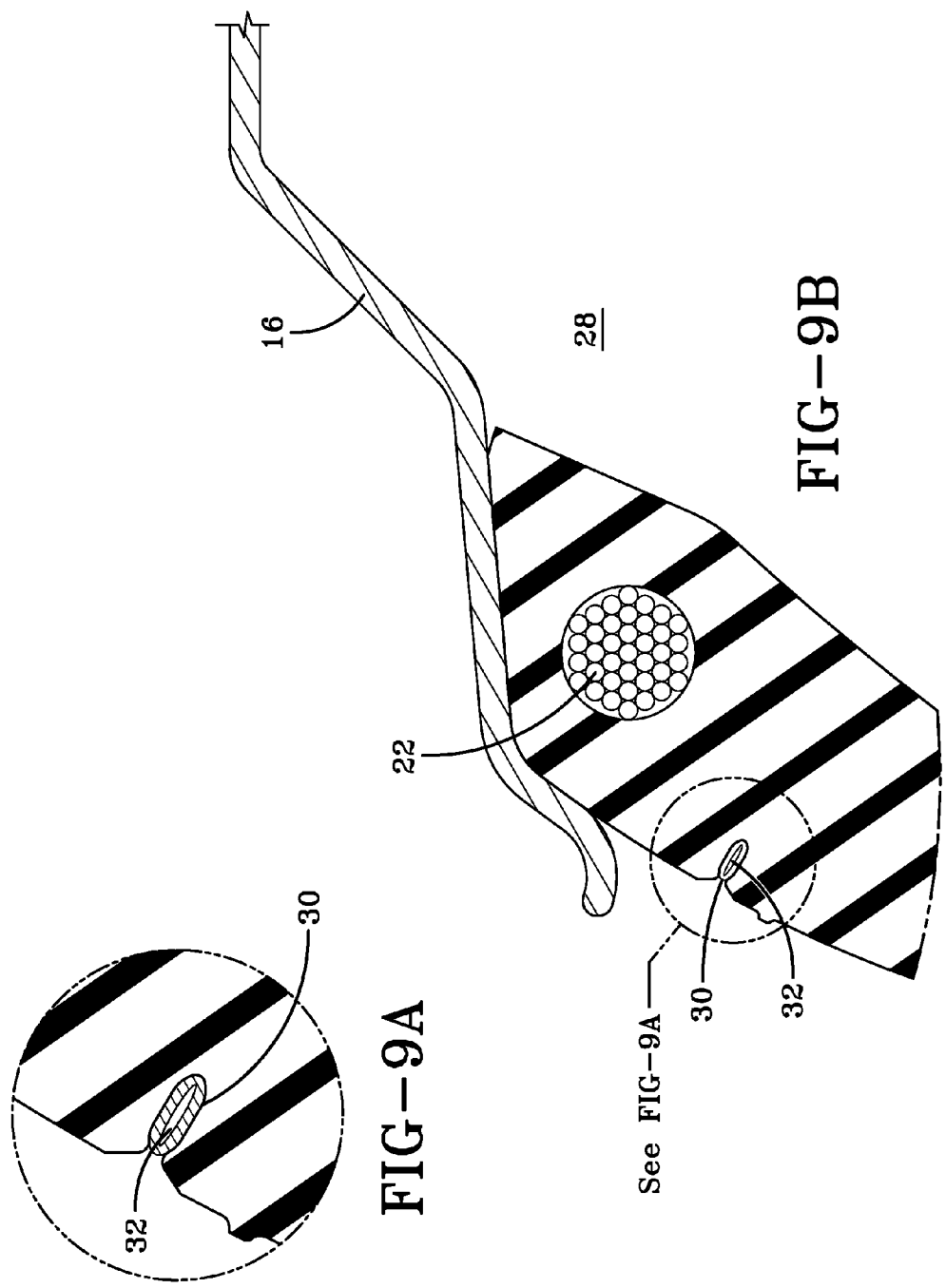

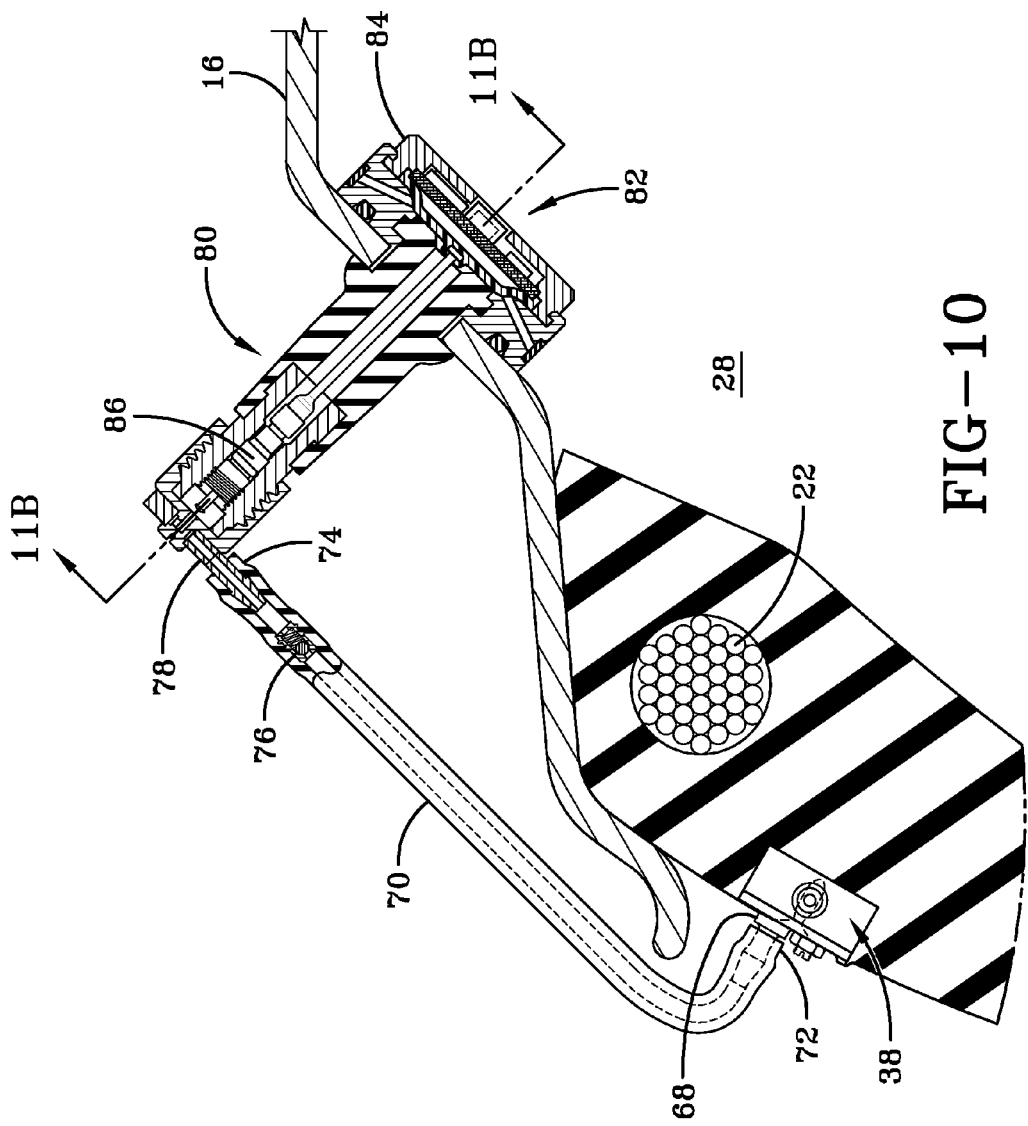

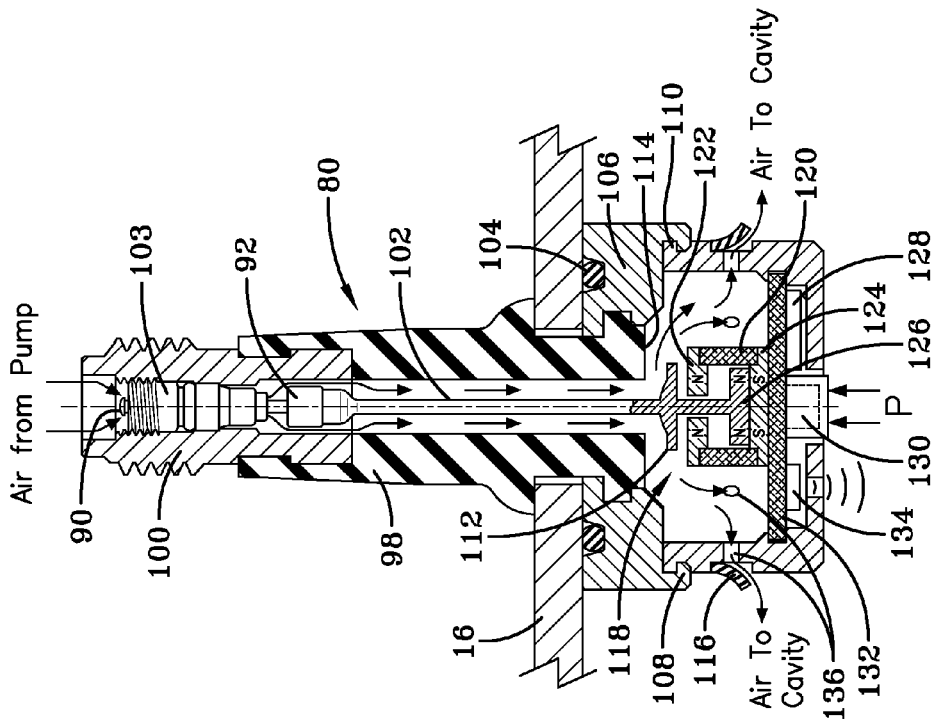
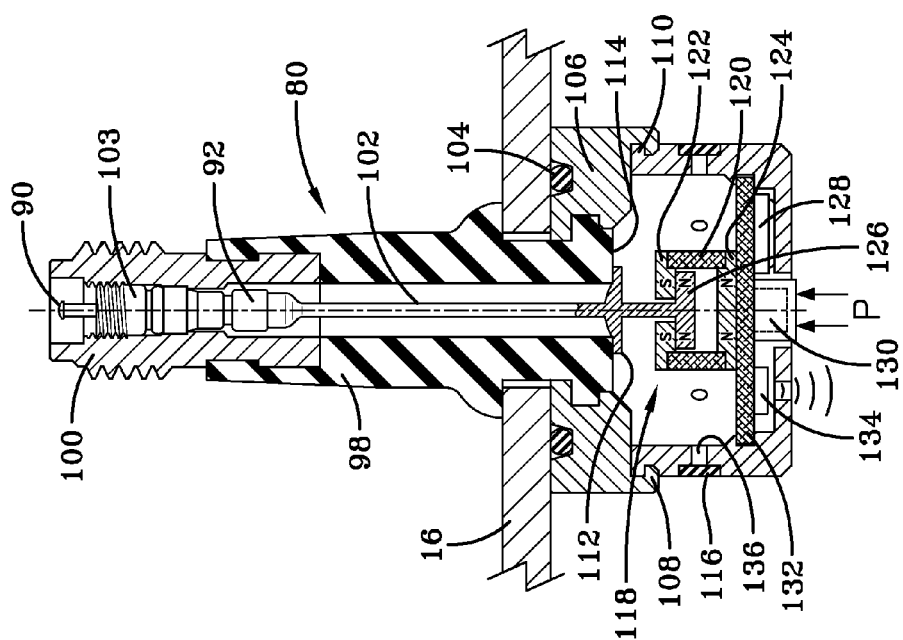
FIG-12A
FIG-12B

VALVE STEM-BASED PRESSURE REGULATOR SYSTEM FOR AN AIR MAINTENANCE TIRE AND METHOD

FIELD OF THE INVENTION

The invention relates generally to air maintenance tires and, more specifically, to a tire assembly incorporating an air pumping mechanism into a tire for maintaining tire air pressure.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is a desirable, therefore, to incorporate an air maintenance feature within a tire that will self-maintain the tire air pressure in order to compensate for any reduction in tire pressure over time without a need for driver intervention.

SUMMARY OF THE INVENTION

According to an aspect of the invention, an air maintenance tire assembly and method of operation includes a pressurized air supply assembly for supplying pressurized air to a tire cavity through an elongate, radially outward projecting, valve stem passageway. The valve stem is configured to have an elongate centrally disposed shaft reciprocally moveable axially along a radial path in the valve stem internal air passageway between a passageway-opening axial position and a passageway-closing axial position. A pressure regulator is provided to move the elongate shaft axially between the passageway-opening and passageway-closing positions responsive to a detected air pressure level within the tire cavity.

In another aspect, the pressure regulator includes a pressure measuring sensor for measuring a tire cavity pressure level; a transmitter for transmitting a control signal responsive to the measured tire cavity pressure level; and a valve mechanism for moving the elongate shaft axially between the passageway-opening and passageway-closing positions responsive to the control signal.

Pursuant to a further aspect, the pressure regulator is coupled to an inward end of the elongate shaft. A sealing ring member is mounted to and substantially surrounds the elongate shaft proximate to an inward end, the sealing ring member obstructing the valve stem air passageway within the valve stem responsive to an axial movement of the elongate valve shaft to close a flow of air through the valve stem internal air passageway and into the tire cavity.

The pressure regulator, in yet a further aspect, includes a regulator housing having an enclosed air chamber positioned for pressurized air flow communication with the valve stem internal air passageway. The regulator housing has an opening for directing pressurized air from the housing air chamber into the tire cavity and a sealing member mounted to the regulator housing. The sealing member selectively opens and closes the regulator housing opening responsive to a presence and absence of pressurized air within the regulator housing air chamber.

The valve stem is sized and configured to extend from the tire through an aperture extending through a rim body supporting the tire; and the regulator housing is mounted to an inward-facing surface of the rim body. A supply of pressurized air, in another aspect, is generated by an elongate air pumping passageway located within a tire sidewall. The pumping passageway will compress segment by segment from an expanded diameter to a substantially reduced diameter responsive to a bending strain introduced into the tire sidewall from a rolling tire footprint. Air forced segment by segment along the sidewall air passageway is directed into an outward end of the valve stem passageway via a connecting air passageway tube.

Definitions

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 9A is an enlarged fragmentary section view (taken from FIG. 2) of the tire/rim/bead area showing pump tube location.

FIG. 9B is an enlarged view of the pump tube located in a groove opening.

FIG. 10 is an enlarged fragmentary section view (taken from FIG. 2) showing the AMT valve stem regulator mounted into a rim and connected to the pump tube transfer housing.

FIG. 12A is an enlarged sectioned view of the AMT valve stem regulator showing the electroactive polymer disk in un-charged position and the pressure sensor receiving a low pressure signal.

FIG. 12B is an enlarged sectioned view showing the electroactive polymer in a charged position pulling the core rod downward and allowing air flow to cavity.

DETAILED DESCRIPTION OF THE INVENTION

Figure 1:
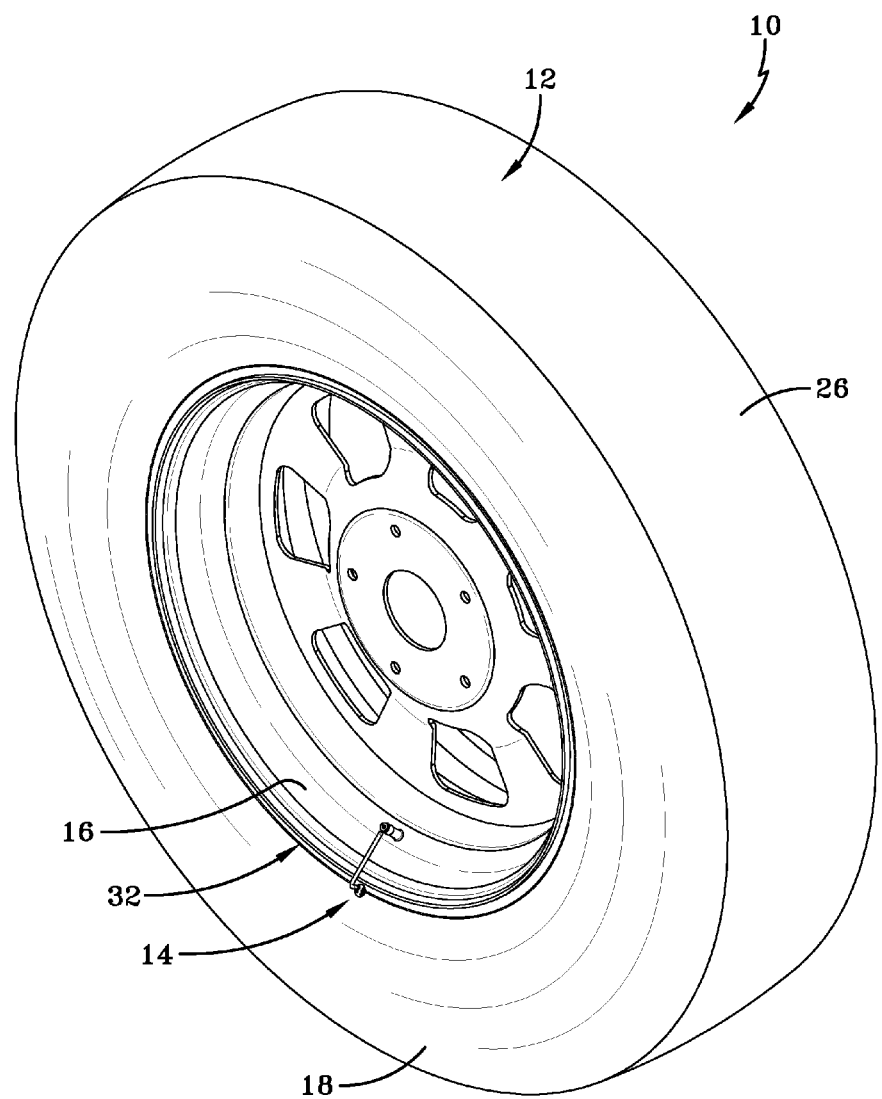
FIG. 1 is a perspective view showing the assembly tire, tube and pump location.

Referring to FIGS. 1, 2, 3 and 4, a tire assembly 10 includes a tire 12, a peristaltic pump assembly 14 and a tire rim 16. The tire mounts in conventional fashion to the rim 16. The tire is of conventional construction, having a pair of sidewalls 18, 20 (only sidewall 18 being shown) extending from opposite bead areas 22, 24 (only bead area 22 being shown) to a crown or tire read region 26. The tire and rim enclose a tire cavity 28 (see FIG. 9B).

Figure 2:
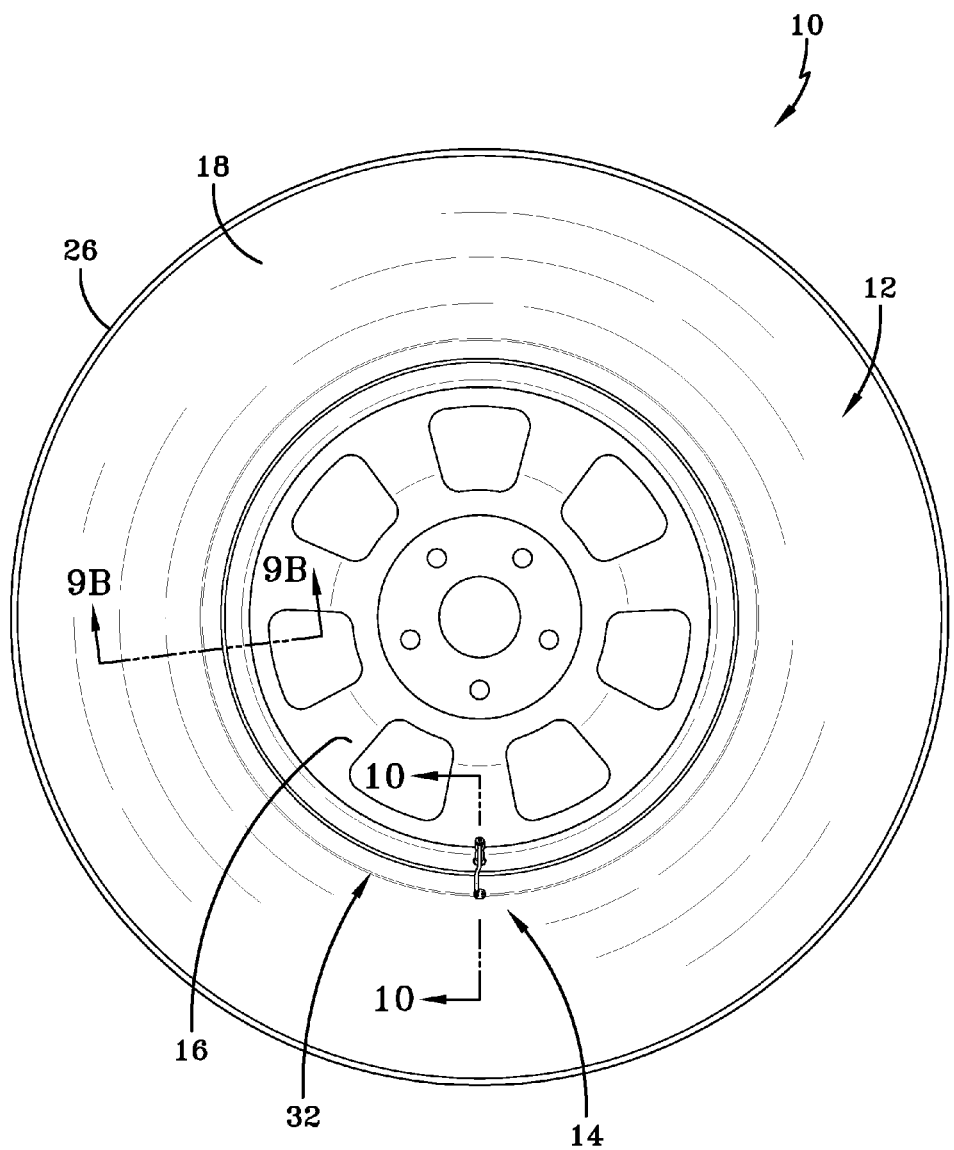
FIG. 2 is a side view of FIG. 1.
Figure 3:
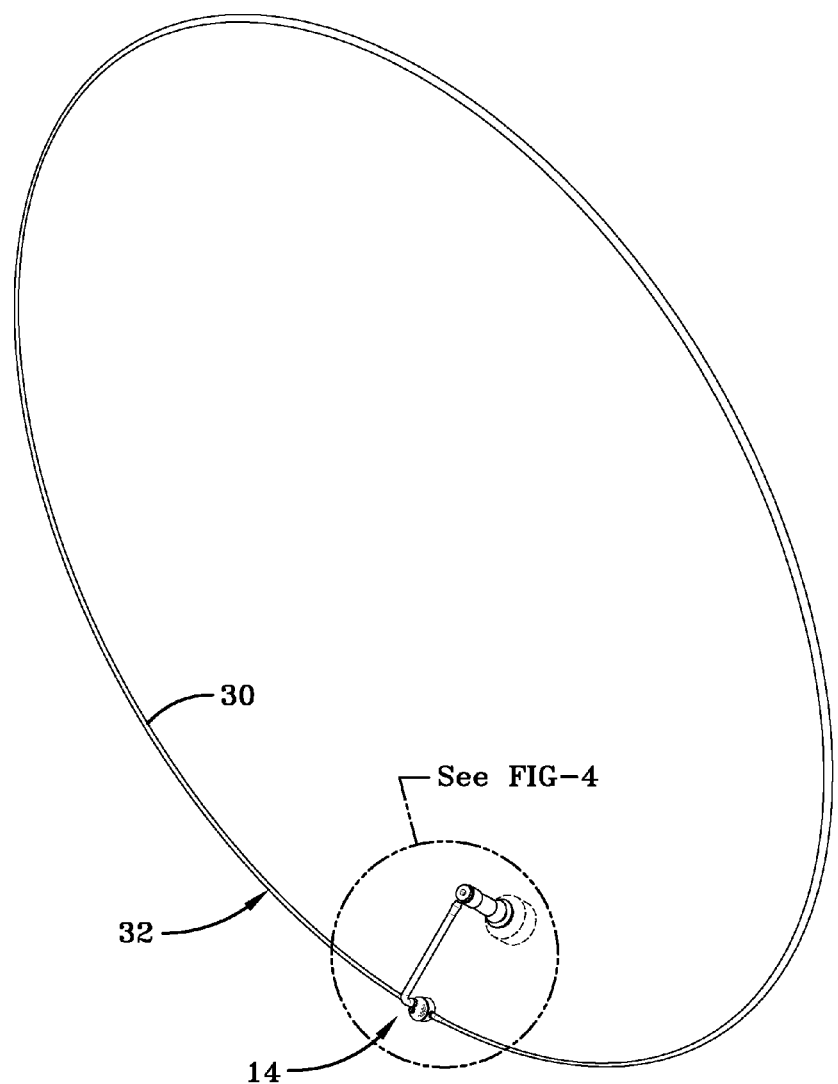
FIG. 3 is a view showing the pump sub-assembly, with the pump tube connection to AMT valve stem regulator.

As seen from FIGS. 2 and 3, the peristaltic pump assembly 14 includes an annular air tube 30 that encloses an annular passageway 32. The tube 30 is formed of a resilient, flexible material such as plastic or rubber compounds that are capable of withstanding repeated deformation cycles. So constructed, the tube may deform within a tire into a flattened condition subject to external force and, upon removal of such force, return to an original sectional configuration. In the embodiment shown, the cross-section of the tube in an unstressed state is generally circular but other alternative tube geometries may be employed if desired. The tube is of a diameter sufficient to operatively pass a requisite volume of air sufficient for the purpose of pumping air into the tire cavity 28 to maintain the tire 12 at a preferred inflation pressure.

The peristaltic principles of incorporating a deformable air tube within a tire are shown and described in U.S. Pat. No. 8,113,254, incorporated herein by reference in its entirety. In the patented system, the tube is incorporated within an annular tire passageway formed within the tire proximate a tire bead region. As the tire rotates, air from outside the tire is admitted into the tube and pumped along the air tube by the progressive squeezing of the tube within the tire as the tire rotates. Air is thus forced into an outlet valve and then into the tire to maintain air pressure within the tire cavity at a desired pressure level.

The tube 30 mounts closely within a groove in the tire and sequentially flattens as the tire rotates. The segment by segment flattening of the tube as the tire rotates operates to pump air along the air passageway 32, air which is then directed into the tire cavity 28 to maintain air pressure. A peristaltic pumping system employing a tube within a sidewall groove is shown in issued U.S. Pat. No. 8,042,586, incorporated herein by reference in its entirety.

Figure 4:
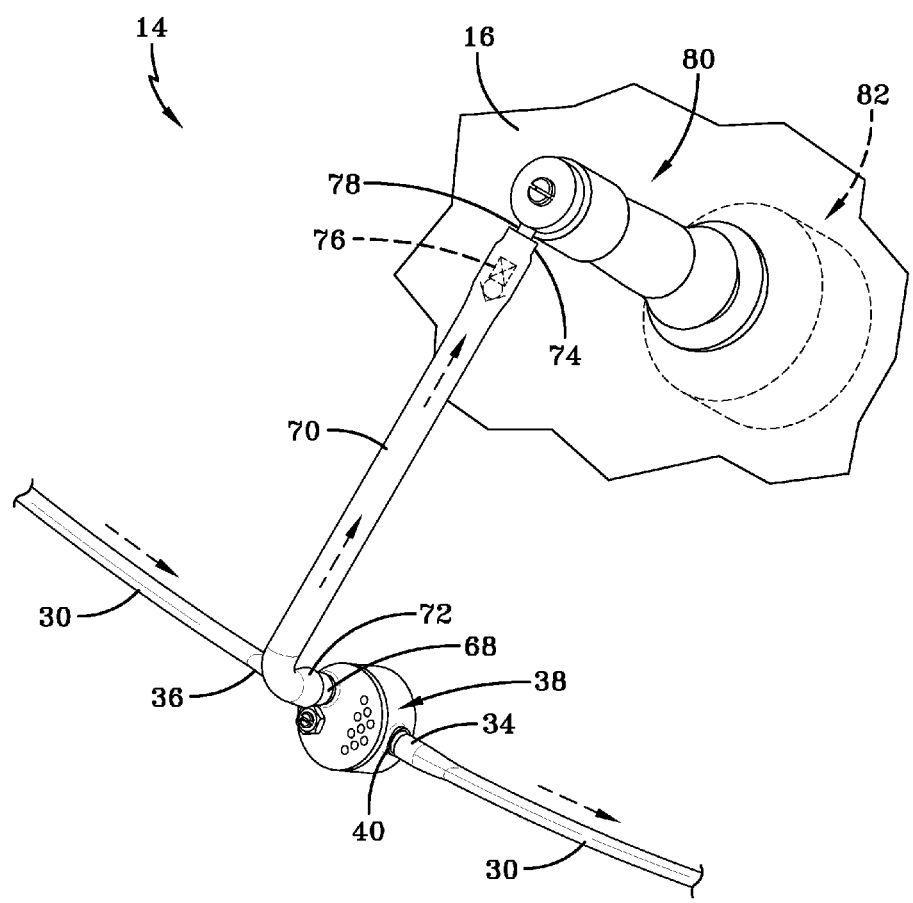
FIG. 4 is an enlarged fragmentary view taken from FIG. 3 showing the pump tube transfer housing and the tire AMT valve stem regulator.
Figure 5A:
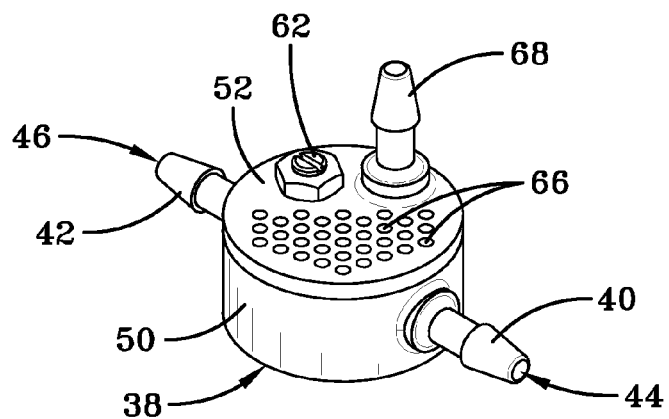
FIG. 5A is a perspective view of pump tube transfer housing assembly.
Figure 5B:
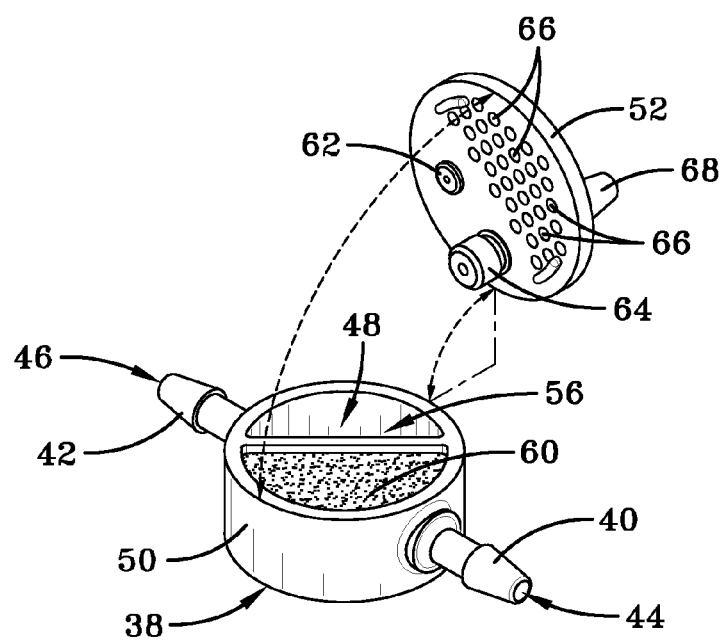
FIG. 5B is a perspective view of pump tube transfer housing with the cover tilted backward.

Referring to FIGS. 3, 4, 5A and 5B, the pump tube 30 is generally annular and circumscribes a lower tire sidewall region proximate to a bead region. However, other configurations for the air tube may be devised without departing from the invention. Opposite ends 34, 36 of the tube 30 connect to a pump tube transfer housing 38. Frustro-conical pump tube ports 40, 42 taper away from the pump tube housing, each having an internal axial air passageway 44, 46, respectively, which provide air passages into the housing 38. The tube ports 40, 42 taper inward to a remote end and are received within ends of the tube 30 as seen in FIG. 4 to couple the air tube 30 to the housing 38. The housing 38 is shown having cylindrical sides 50 and planar top and bottom panels 52, 54, defining a transfer housing internal chamber 48. The internal chamber 48 is bifurcated into a pump tube transfer chamber 56 and a filter chamber 58 which receives and houses a porous filter component 60 therein.

The top panel 52 encloses the chambers 56, 58. A relief valve 62 is mounted to the top panel 52 and communicates with the transfer chamber 48. A one-way valve 64 mounts to the top panel 52 adjacent the relief valve 62 and is in air flow communication with the transfer chamber 48. An array of through-apertures 66 extends through the top panel 52, disposed over the transfer chamber 48 so as to facilitate an inflow of ambient air into the filter 60 and then into the air tube as will be explained. The one-way valve 64 extends through the panel 52 to a tapered port 68 port to valve stem regulator (see FIG. 4).

Figures 6A, 6B:
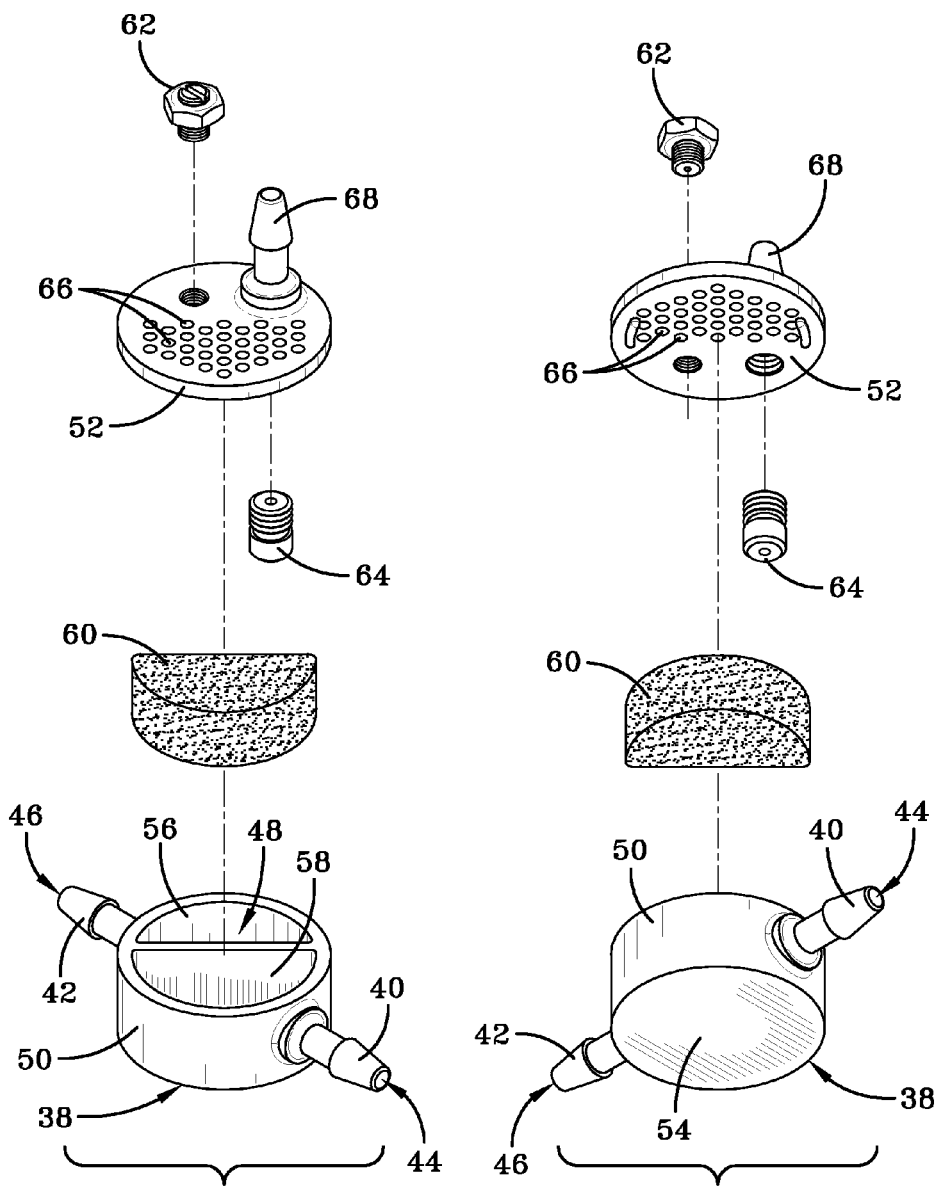
FIG. 6A is an exploded top perspective view of the pump tube transfer housing components.
FIG. 6B is an exploded bottom perspective view of the pump tube transfer housing components.

Assembly of the transfer housing and components will be understood from FIGS. 6A and 6B. The transfer housing 38 receives a porous filter component 60 into the filter chamber 58. The one-way check valve 64, of a type commercially available, is affixed through a sized aperture in the top panel 52 by screw thread engagement or other assembly mechanism. The port to AMT valve Stem regulator 68 attaches to the valve 54 and directs air from the valve to a regulator. The relief valve 62 mounts to the top panel 52 by screw thread engagement or other known technique. Thus assembled, the relief valve 62 and the one-way valve 64 are in air flow communication with air within the transfer chamber 48. Air flow into the chamber 48 is through the apertures 66 within the top panel 52.

Referring to FIGS. 3 and 4, the pump tube is shown connecting opposite ends 34, 36 over the pump tube ports 40, 42 (not shown) of the transfer housing 38. The port to valve stem 68 from the transfer housing 38 is connected to an end 72 of an elongate connecting tube 70. An opposite end 74 of the connecting tube 70 attaches to a stem 78 to a tire valve stem 80. Seated within the stem 78 is a one-way check valve 76 (see FIG. 10) that opens and closes to admit air from the pump tube 30 into the valve stem 80.

Figure 7:
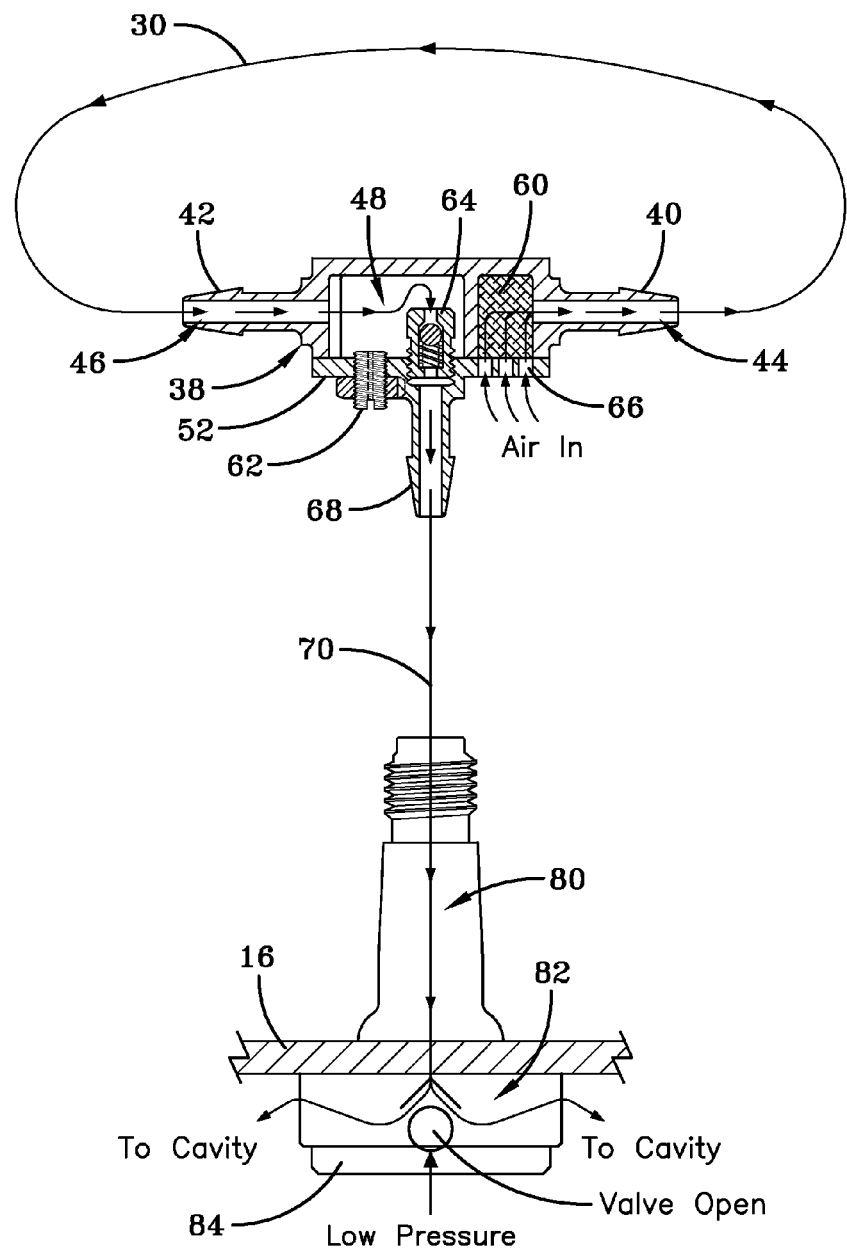
FIG. 7 is a schematic view showing air flow from atmosphere around the pump tube, through the transfer housing to the AMT valve stem regulator and then out to the tire cavity.
Figure 8:
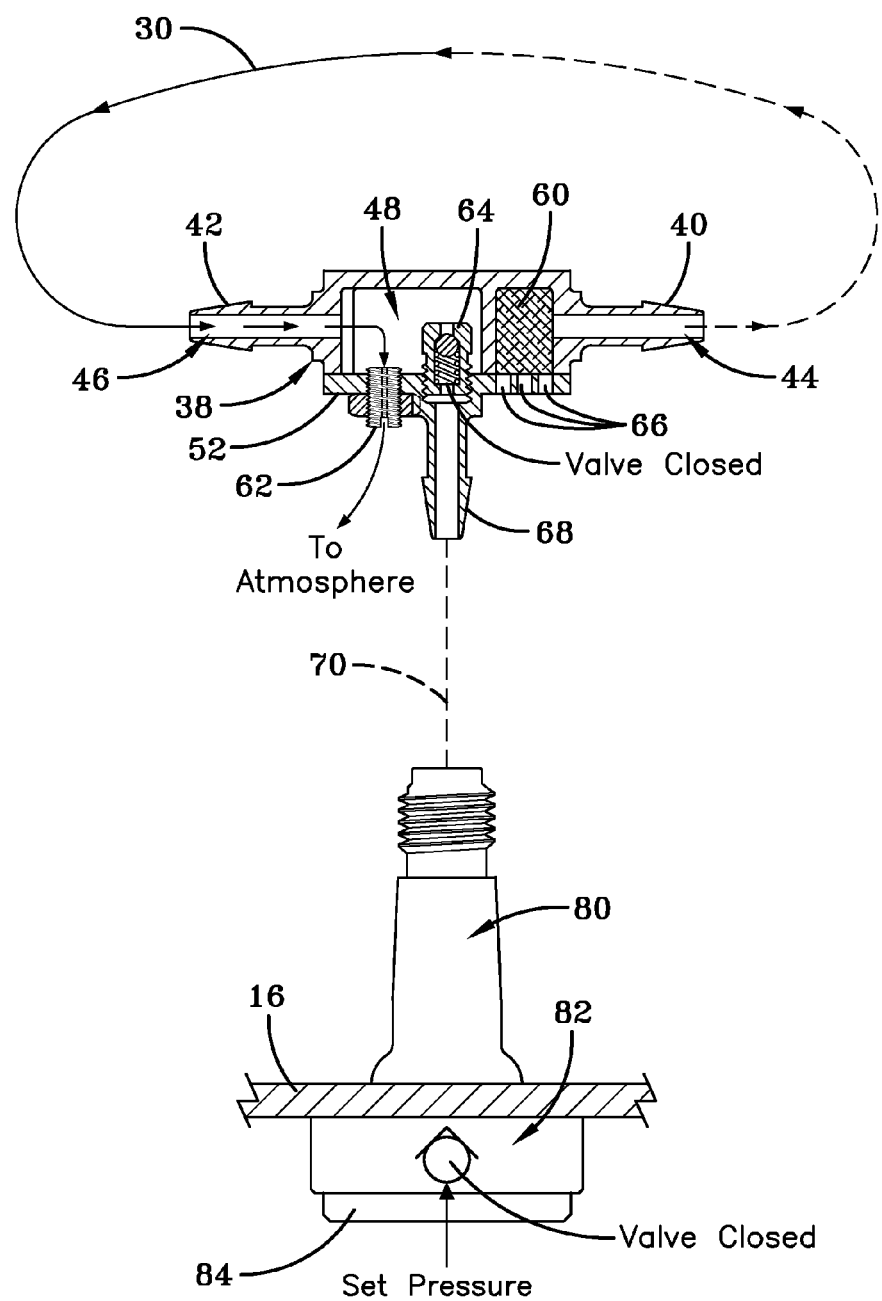
FIG. 8 is a schematic view where the tire cavity is at pressure and the AMT valve stem regulator is closed forcing air in the transfer housing back out to atmosphere.

FIGS. 7 and 8 respectively show diagrams of the AMT system for the "open" condition in which air is pumped into the tire cavity, and for the "closed" position in which the cavity pressure is at desired level. The AMT valve stem 80 incorporates a pressure regulator assembly 82 at a lower or inward end. The regulator assembly 82 includes a regulator housing 84, that opens and closes to place the AMT regulator assembly 82 in "open" and "closed" states. It will be seen that air is admitted into the transfer housing 38, passes through the filter component 60, and is directed into the tube 30. The tube 30 is incorporated into a groove within a tire sidewall (see FIGS. 9A and 9B) and is progressively flattened by rotation of the tire against a ground surface, as disclosed by U.S. Pat. No. 8,113,254 B2. Alternatively, without departing from the invention, the air passageway 32 may be encapsulated directly within a tire component, dispensing with the use of a tube 30. In such an embodiment (not shown), the air passageway would likewise pump air segment by segment as the tire rotates, and the air passageway would be directly coupled at opposite ends to the transfer housing.

As the tire continues to rotate along a ground surface, the tube 30 will be sequentially flattened or squeezed opposite the tire footprint segment by segment. The sequential flattening of the tube passageway 32 segment by segment, represented by FIGS. 9A and 9B, causes evacuated air from the flattened segments to be pumped in the direction shown in FIGS. 7 and 8 to the transfer housing 38. When the air flow pressure is sufficient against the one-way valve 64, the valve will open and allow air to flow through the outlet port 68 and into the connecting tube 70. Air is directed by the connecting tube 70 to the AMT valve stem 80. The pressure regulator 82 opens as shown in FIG. 7 when the air pressure within the tire is low, allowing air from the connecting tube 70 to pass through regulator 82 from the valve stem 80 and into the tire cavity. When air pressure within the tire cavity is at or above the set pressure, as shown in FIG. 8, the regulator 82 closes and air cannot be pumped from the transfer housing 38 into the connecting tube 70. Instead, pressurized air is retained within the transfer housing chamber 48 until vented through the relief valve 62 to the atmosphere.

Figures 11A, 11B:
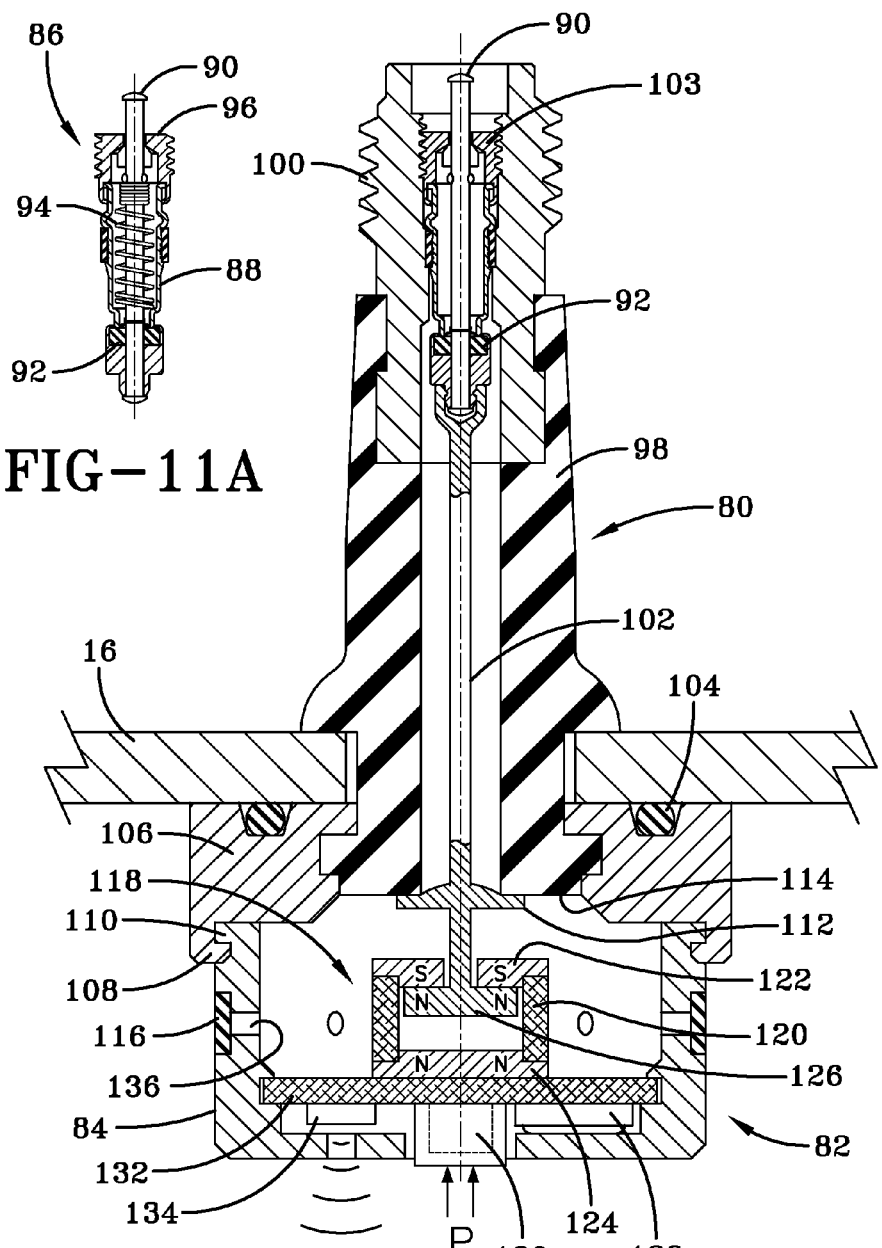
FIG. 11A is a sectioned view of a standard Schader valve core.
FIG. 11B is an enlarged sectioned view (taken from FIG. 10) of the AMT valve stem regulator components and modified valve core with the spring removed and connecting rod attachment to an electroactive polymer disk.
Figure 13:
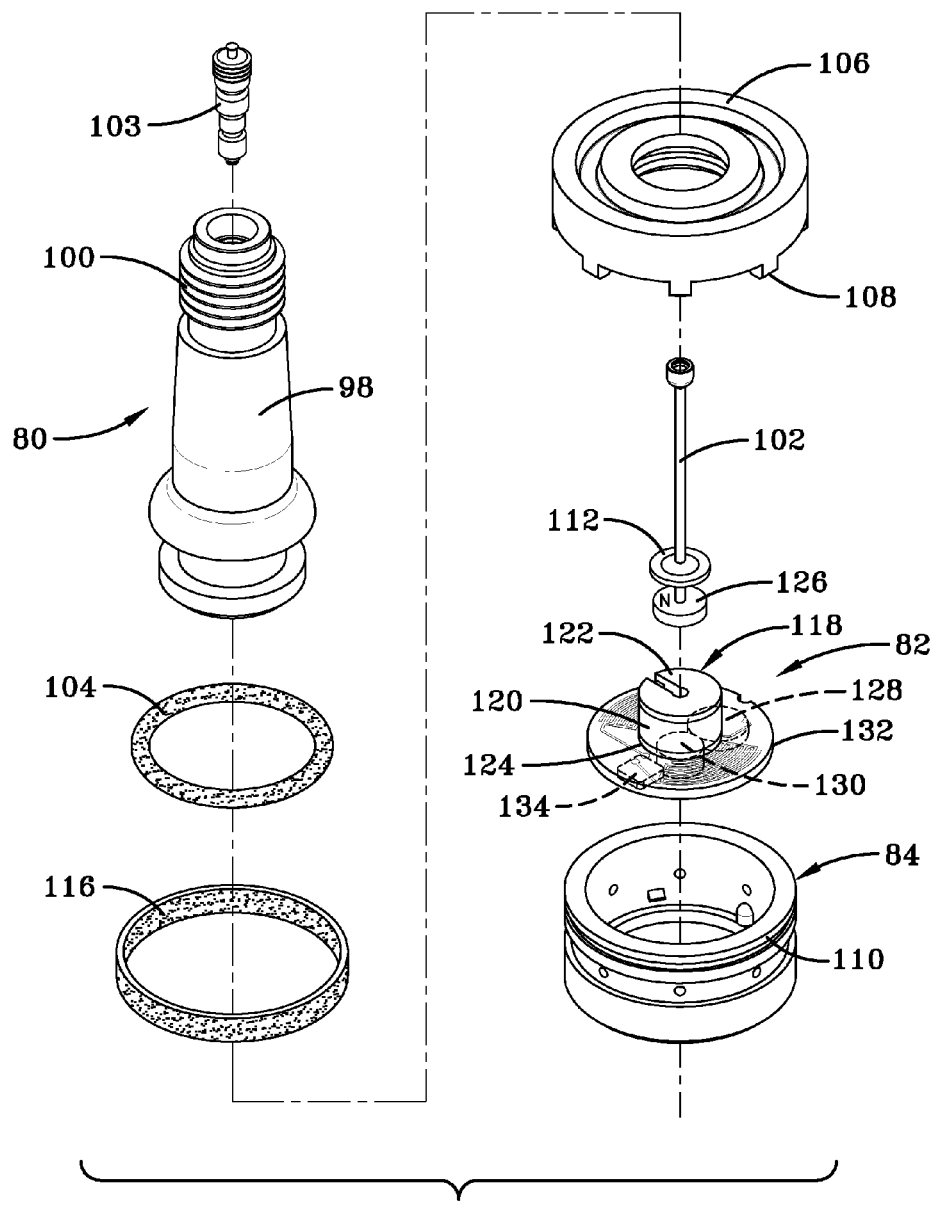
FIG. 13 is an exploded perspective view of the AMT Valve Stem Regulator components.

FIGS. 10, 11B and 13 show the AMT valve stem 80 and regulator 82 in greater detail. In FIG. 11A, a conventional valve stem core 86 used for conventional inflation of tires is shown. The valve core 86, conventionally referred to as a "Schrader Valve Core" in the industry, includes an elongate housing 88 through which a valve shaft 90 extends. A valve seal component 92 seats within the housing 88 and is coupled to the valve shaft 90. A biasing spring 94 encircles the valve shaft 90 and biases the sealing component 92 within the housing in an "up" or closed position against the sealing seat. An air passageway through the valve 86 is biased in a closed state until the valve shaft 90 is depressed and the sealing valve component 92 is moved thereby to a down or open position, whereby allowing atmospheric air to enter the valve passageway and be directed toward a tire cavity.

The valve 86 is modified in the subject AMT valve stem 80 by the removal of the biasing spring 94 as will be seen in FIGS. 10, 11B, 12A, 12B and 13. The modified valve core 103 is seated within an externally screw threaded coupling collar 100. The coupling collar 100 is received within and retained by a rubber sleeve 98 and projects outward. As used herein, "inward" and "outward" are used to designate directional orientation relative to a tire cavity 28; "inward" meaning toward the tire cavity and "outward" meaning away from the tire cavity. The assembled collar 100 and sleeve 98 and valve core 103 constitute the valve stem 80 of the tire. A valve shaft 102 extends along a through-passageway in the sleeve 98. The sleeve 98 is retained within an aperture through the rim 16. The regulator 82 is housed within a regulator housing 84. The housing 84 attaches to a rim inward surface by means of a mounting bracket 106. The sleeve 106 from the valve stem 80 extends through the rim 16 and attaches at an inward end to the mounting bracket 106. The housing 84 is attached by the bracket 106 to an inward underside surface of the rim 16. O-ring 104 is captured between the rim 16 and bracket 106 and seals the interface between the bracket 106 and the rim 16. The housing 84 couples to the mounting bracket 106 by means of interlocking flanges 106, 108.

With reference to FIGS. 11B and 13, the regulator assembly 82 is housed within the housing 84. A backup seal component in the form of circular disk 112 is affixed to the valve shaft 102 toward a lower or inward end. The component 112 creates a redundant back up seal against the bottom end 114 of the sleeve 98. A sealing ring 116 of rubber or elastomeric composition is provided to circumscribe and seat within an annular air flow opening 136 within the housing 84. A magnetic switching device 118 is supported by a PC board 132 within an insulator housing 120. Stationary poles 122, 124 of the device 118 are mounted at opposite sides of the housing 120 while moveable poles 126 are affixed to a lower end of the valve shaft 102. The poles 122, 124 are electronically changed by a control signal, causing the moveable poles 126 carried by shaft 102 to move reciprocally in an axial direction. Movement of the shaft 102, actuated by controlled attraction and repulsion of the poles 126 to stationary poles 122, 124, cause the sealing component 112 to move in and out of sealing engagement against passageway end 114. The passageway is thus open and closed to pressurized air flow by the operation of magnetic switch device 118. An energy harvester 128, a pressure sensing device 130, and a transmitter/receiver device 134, of types commercially available, are mounted to the underside of PC board 132. An energy harvester of a suitable type is commercially available through industry supply sources such as MIDE Technology Corporation of 200 Boston Avenue, Suite 1000, Medford, Mass. A transmitter/receiver device of suitable type is commercially available from Digi-Key Corporation of 701 Brooks Avenue South, Thief River Falls, Minn. Also available from Digi-Key Corporation is a magnetic switch and a pressure sensing device.

The sensing device 130 measures the air pressure within the tire cavity and transmitter 134 sends a control signal to the magnetic switching device 118 which, in a low tire cavity pressure situation, will switch the system into an "open" configuration, allowing pressurized air to pass through the passageway of valve stem 80 and into the housing 84. The pressurized air will then cause the sealing ring 116 to swing open, allowing the pressurized air within housing 84 to enter the tire cavity. When the air pressure is at or above the threshold level, the sensor 130 will cause the control signal from transmitter 134 to the magnetic switch device 118 and move the device 118 into a closed position. In the closed position, shaft 102 will be moved axially outward, re-establishing the seal from disk 112 against the lower end 114 of the shaft passageway.

FIGS. 12A and 12B respectively show the subject regulator 80 in the closed and open conditions. When the pressure in the tire cavity is at or above recommended pressure, the pressure sensor 130 detects that the tire is fully inflated. The filled pressure signal from the transmitter 134 is sent to a data collection and/or display processor for informing the vehicle user of the fully inflated tire state. The magnetic switch 118 is placed in an off position by polarity of the magnetic poles 122, 124, 126. Movement of the poles 126 upward to the opposite poles 122 causes the valve shaft 90 to move axially upward, placing the backup seal 112 against the lower end of sleeve 98 and closing off air flow from the pumping tube 30 (FIG. 8). The ring seal 116 is in a tight, non-stressed seal against the regulator housing annular gap 136 and air is not flowing into the tire cavity. The redundant seals achieved by the backup seal 112 and the sealing ring 116 in the closed position act to insure that air flow into the cavity, in the full tire pressure condition, will not occur. The air pumped from the tube 30, as will be noted in FIG. 8, is passed from the chamber 48 of the transfer housing 38 to the atmosphere by way of relief valve 62. The pumping of air by the tire based tube 30 thus continues with the air directed to atmosphere instead of into the tire cavity.

If the air pressure within the tire cavity falls below recommended levels, the regulator 80 switches to the open position as indicated by FIGS. 7 and 12B. Air from the pumping tube 30 is allowed to pass from the transfer housing 38 into the connecting tube 70 as the regulator 80 switches to the open position. The low pressure condition is sensed by the pressure sensing device 130 and a low pressure signal is sent by transmitter to a data processor and vehicle user alert display (not shown). The polarity of the magnetic switching device 118, poles 122, 124, are reversed such that the lower poles 126 secured to the lower end of shaft 90 move axially downward. Downward movement of the shaft 90 moves the backup seal 112 out of sealing engagement with the lower end of sleeve 98, whereby allowing pressurized air to flow down the regulator into the internal cavity of housings 106, 111. The pressurized air forces the sealing ring 116 to resiliently flex outward at a lower end, thus opening the annular gap 136 between the housings. Pressurized air flows through the gap 136 and into the tire cavity to bring the cavity pressure up to recommended levels. The air from pumping tube 30, with the regulator assembly 82 in the open position of FIG. 12B, is shown by FIG. 7 to flow into the connecting tube 70 to the modified AMT valve stem 80.

It will be appreciated that valve shaft 102 thus moves axially up and down reciprocally responsive to the open and closed position of the regulator magnetic switching device 118. The axial position of valve shaft 102 in turn opens and closes the air passage path through the valve stem 80 and into the regulator. The air pressure from pumped air entering the regulator opens and closes the sealing ring 116 to thereby open and close the flow of pumped air into the tire cavity. In the raised shaft 102 position of FIG. 11B, the regulator valve is closed. Air from the pumping tube 30 is only allowed to pass from the transfer housing 38 into the connecting tube 70 as the regulator 82 switches magnetic poles to the open position.

Figure 14:
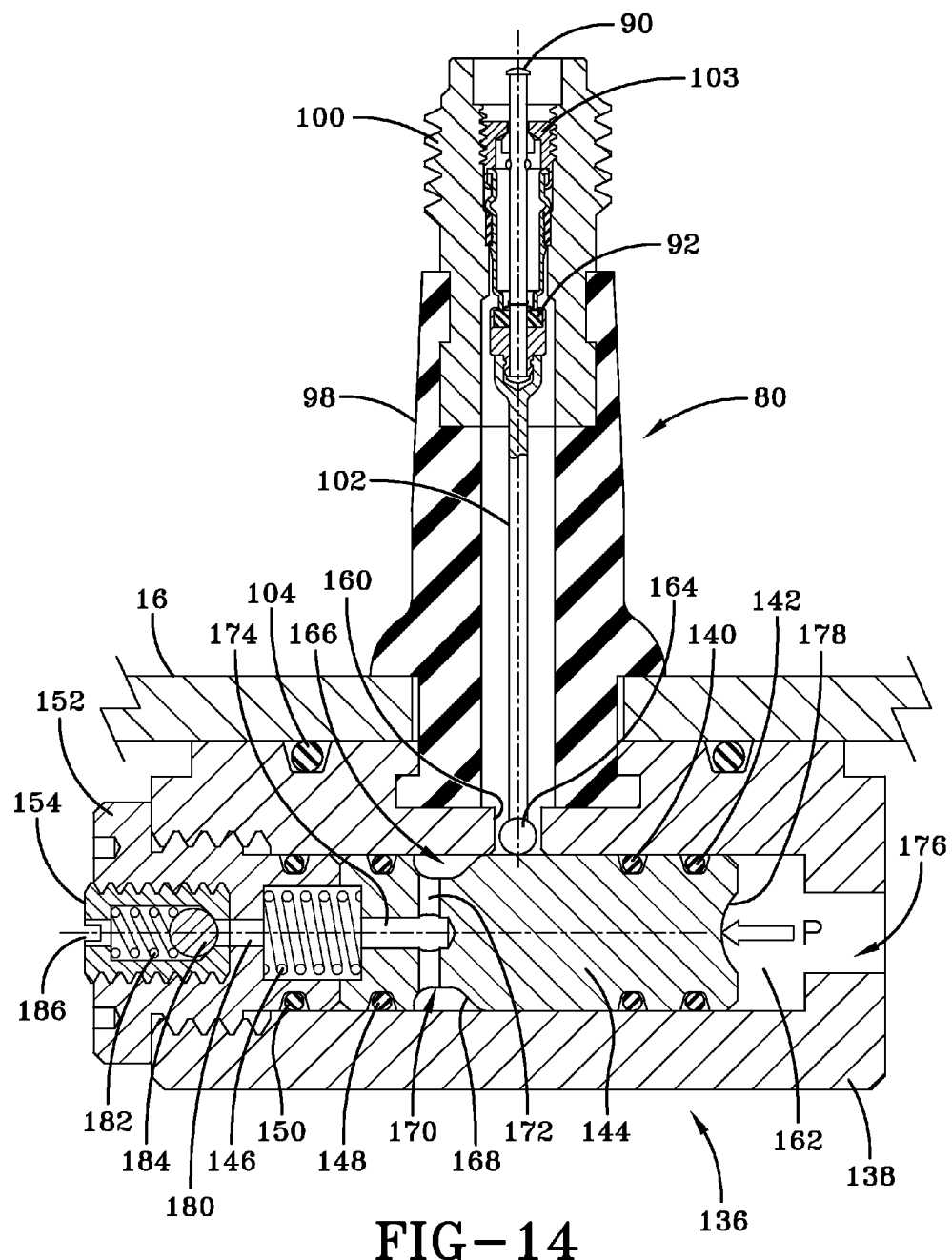
FIG. 14 is a sectioned view showing an alternative rim-mounted AMT valve stem regulator.
Figure 15:
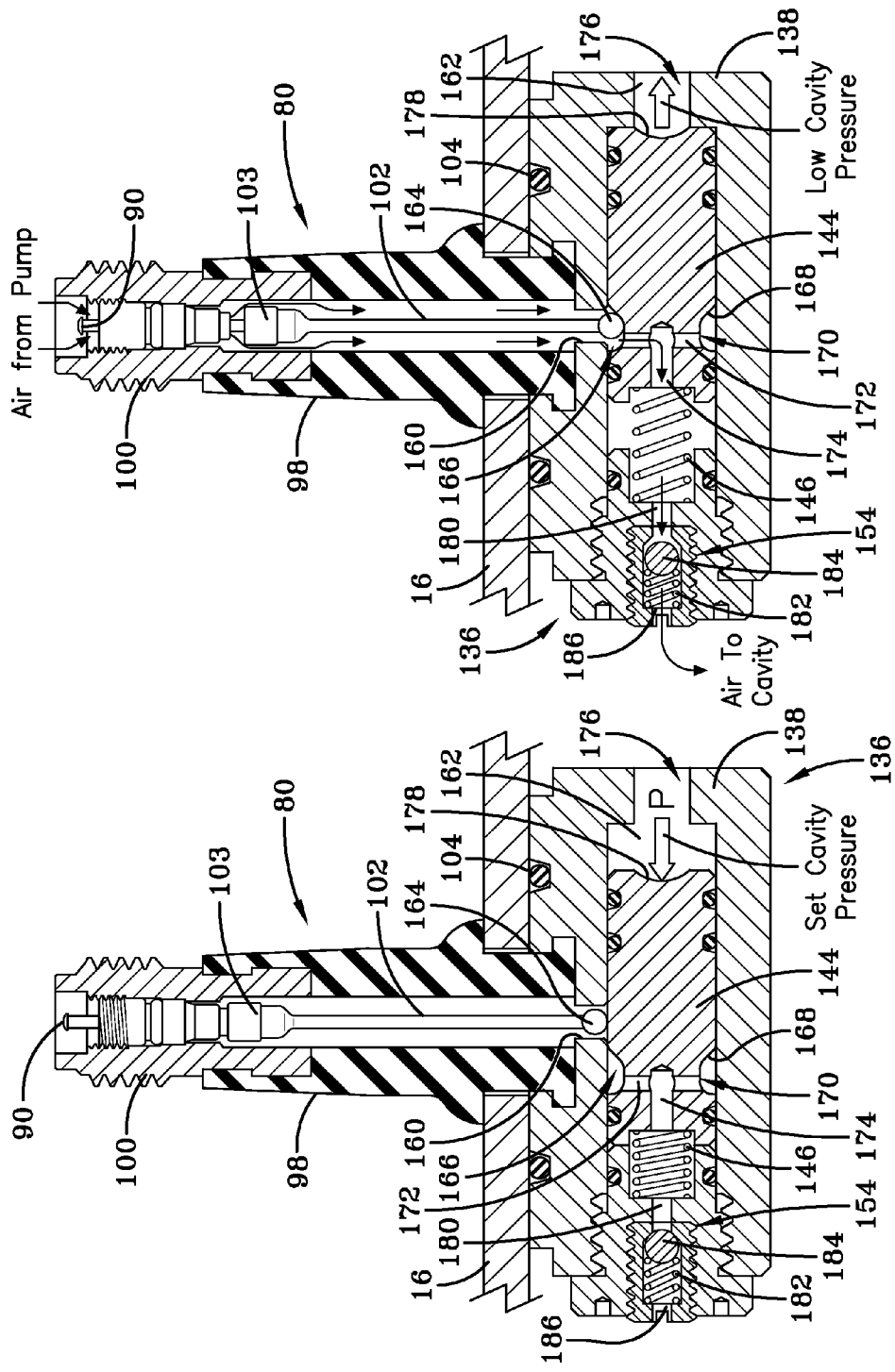
FIG. 15A is a sectioned view of the alternative AMT valve stem regulator shown with the cavity at set pressure and the valve core closed.
FIG. 15B is a sectioned view of the alternative AMT valve stem regulator shown in a low cavity pressure state, with the valve core open.
Figure 16:
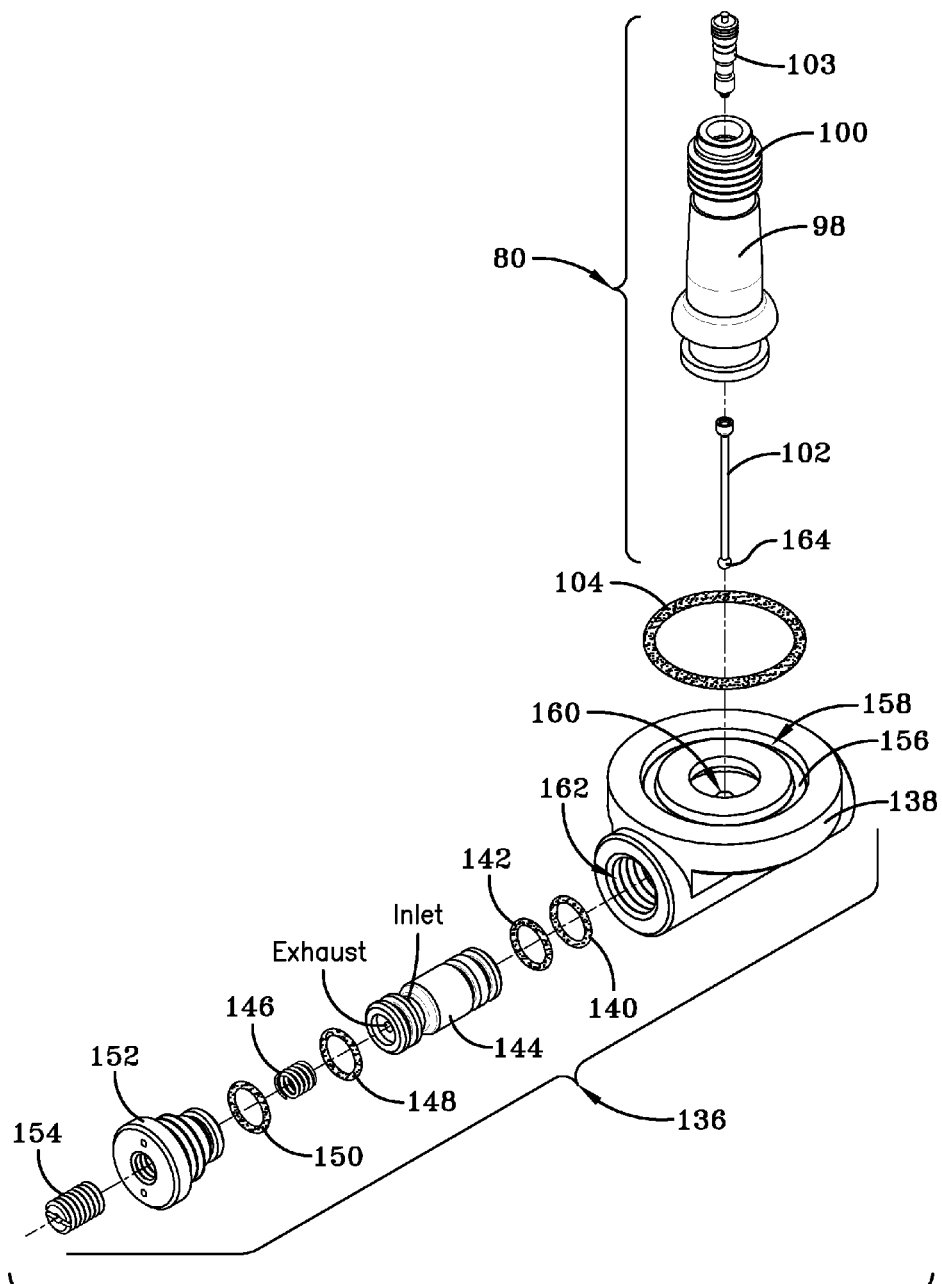
FIG. 16 is an exploded perspective view of the alternative AMT valve stem regulator components.

FIG. 14 is a sectioned view showing an alternative rim-mounted AMT regulator 136 that couples to the AMT valve stem 80 modified from a Schrader valve as discussed and described previously. FIG. 15A is a sectioned view of the alternative AMT valve stem regulator 136 shown with the cavity at set pressure and the valve core closed. FIG. 15B is a sectioned view of the alternative AMT valve stem regulator 136 shown in a low cavity pressure state, with the valve core open. FIG. 16 is an exploded perspective view of the alternative AMT valve stem regulator 136 components.

With reference to FIGS. 14, 15A, 15B and 16, the alternative regulator 136 is shown to include an elongate regulator housing 138, first and second sealing O-rings 140, 142, an elongate cylindrical piston 144, a biasing spring 146, third and fourth sealing O-rings 148, 150, an exhaust head 152, and a one-way valve 154. The housing 138 includes an annular rim seal seat 156 within a circular top mounting surface 158 and downwardly oriented shaft passageway 160 extending into a piston seating elongate chamber 162 horizontally disposed within the interior of the housing 138. The valve stem 80, as with the embodiment of FIGS. 11A, 11B described previously, includes a rubber sleeve 98 or boot, a threaded collar 100, and a modified valve core 103 positioned within the collar 100 and axially aligned with a central passageway down the valve stem 80. The modified valve core 103 is a conventional Schrader valve core modified by the removal of a biasing spring. The modified valve core 103 is coupled to the elongate valve shaft 102. Valve shaft 102 is adapted to provide a sealing ball protrusion 164 at an inward end.

The piston 144 is elongate and cylindrical and, seated within the piston chamber 162 of housing 138, reciprocally moves axially between closed and open positions shown in FIGS. 15A and 15B, respectively. The piston body has an annular detent groove 166 extending into an outer surface, the groove 166 defined by a rearward declining surface 168 sloping downward and forward to a bottom groove seat 170 at a forward end of the groove 166. The piston further has annular seal-receiving grooves for receiving the O-rings 140, 142, 148, the O-rings abutting the sidewalls defining piston chamber 162. A transversely extending air passageway 172 extends from the groove seat 170 to an exhaust axial passageway 174 within the piston. The passageway 174 extends through the piston to a forward piston end. A rearward end 178 of the piston 144 is exposed to the air pressure within the tire cavity by means of a rearward opening 176 within the piston housing 138. Positioned within the piston chamber 162, the piston 144 reciprocally moves axially within the chamber 162 responsive to the tire cavity pressure P as shown in FIGS. 15A and 15B and explained below.

The exhaust head 152 receives O-ring within an annular groove and screw threads into a forward end of the regulator housing 138. Spring 146 is seated within an inward positioned end of the exhaust head 152 and compresses against a forward end surface of the piston 144. The one-way ball valve 154 is housed within the exhaust head 152 and positioned in front of the compression spring 146. An axial air passage 180 extends through the exhaust head 152 to an exhaust port 186. In the assembled condition illustrated in FIGS. 14, 15A, 15B, the air passage 180 of the exhaust head 152 aligns axially with the piston air passageway 174. In the assembled condition, as shown in FIG. 14, 15A, 15B, the regulator 136 mounts to an underside of the tire rim 16 with an elongate axis of the regulator assembly oriented tangential to the underside mounting surface of the rim 16 and perpendicular to the longitudinal axis of the elongate valve stem 80. So positioned, axial movement of the piston valve is directionally perpendicular to the longitudinal axis of the valve stem 80.

FIGS. 15A and 15B respectively show the valve and regulator in the closed and open positions. In FIG. 15A, the cavity is at set pressure P, forcing the piston the compressed spring 146. So positioned, piston 144 is axially in a relatively forward location within the piston chamber 162. In the open condition, the ball protrusion 164 of the valve shaft 102 from the modified valve core 103 impinges upon an outward surface of the piston 144. Air within the valve stem passageway is thus blocked from exiting by the piston 144. In the closed position, the valve shaft 102 is in an axially outward orientation within the valve stem 80.

In the closed position of FIG. 15A, air pumped from the tube 30 (FIG. 7) is blocked from entering the AMT valve stem 80. The pumped air is thus directed from the chamber 48 of the transfer housing 38 to the atmosphere by way of relief valve 62. The pumping of air by the tire based tube 30 thus continues unabated but the air from the tube is directed to atmosphere instead of into the tire cavity.

If the air pressure within the tire cavity falls below recommended levels, the regulator 82 switches to the open position as indicated by FIG. 15B. The low cavity pressure will cause spring 146 to expand against the forward end of piston 144, causing the piston to move axially to the rear of housing 138. When the piston has moved to a sufficient extent, the groove 166 of the piston moves into alignment with the air passage through the valve stem 80. The ball protrusion 164 at the end of the valve shaft 102 is thus freed to fall through the opening 160 and onto the sloped surface 168. The ball protrusion 164 of the shaft 102 rides surface 168 into the groove seat 170. An air flow from the pumping tube 30 is thus established by the relocation of the ball protrusion 164. The air flow path extends down through the valve stem 80 into the transverse passageway 172. The air flow path conducts pressurized air flow from the passageway 172 into the axial passageway 174 of the piston. Air pressure is applied against the ball 184 of the one-way valve 154 within the exhaust head 152. The pressurized air moves the ball 184 laterally, overcoming the compression force of spring 146, thus opening the one-way valve 154 to air flow therethrough. Air is thereby directed through the one-way valve 154 and out of the exhaust head passageway 186 and into the tire cavity.

Once air pressure has been restored to the desired set pressure P, the piston will be forced axially into the closed position of FIG. 15A, with the ball protrusion 164 of the valve shaft 102 riding surface 168 out of the piston annular groove 166. Ball protrusion 164 of the valve shaft, in the closed valve position of FIG. 15A, blocks off the air passageway opening 160 at the base of the valve stem 101. It will be noted that a redundant closure to the passing of pressurized air is created by the piston moving out of alignment with the valve stem air passageway and by the simultaneous movement of the ball protrusion 164 into a sealing engagement with the inward end of the valve stem air passageway. It will be appreciated that valve shaft 102 moves axially up and down reciprocally responsive to lateral reciprocal sliding movement of the piston 144 within the piston chamber 162 of the regulator housing 138, whereby opening and closing the air passage opening 160 of the valve stem 80 and opening and closing air flow through the regulator 136 to the tire cavity. The piston 144, ball valve 154 and ball protrusion 164 accordingly represent a valve system for effectively closing and opening air flow into the tire cavity. In the raised shaft 102 position of FIG. 15A, the valve system of the regulator 136 is closed. Air from the pumping tube 30 is only allowed to pass from the transfer housing 38 into the connecting tube 70 after the regulator 136 switches to the open position.

From the foregoing, it will be understood that FIGS. 1 through 13 illustrate a magnetic valve embodiment of the subject invention in which signals from transmitter 134, taken from the pressure measurement device 130, control the opening and closing of a magnetic switch 118. Pressure levels within the tire cavity may thus be controlled. In the embodiment of FIGS. 14 through 16, a mechanical valve system is shown in which a piston 144, check valve 184, and ball protrusion 164 constitute a valve system to control the flow of pressurized air into the tire cavity. Pressurized air is generated by sequential collapse of an air tube 30 within a tire sidewall 18 as the tire rolls against a ground surface. The pressurized air is routed through a transfer housing 38 and directed by a connecting tube 70 to the tire valve stem 80 and, by operation of a regulator 82 or 136, to the tire cavity 28 when the tire cavity pressure fall below a set pressure level. If the pressure within cavity 28 is at or above recommended levels, pressurized air from the pumping tube 30 is vented to the atmosphere until needed should the tire pressure within the cavity fall below the pressure desired.

Both of the embodiments shown utilize a valve stem 80 of a tire in conjunction with a regulator 82 or 136. The invention uses a conventional Schrader valve 86 and removes the spring 94 from inside of it. In a standard Schrader valve 86 found in tires currently, the valve is sealed with a spring 94 loaded action connected to the valve stem 90. The biasing of spring 94 must be overcome with some pressure, usually provided by the stem in an air chuck, to allow the flow of air into the tire. The subject system removes the spring 94 from the valve core, effectively making the valve stem shaft 90 free to move axially. The valve stem 80 of the invention is connected through an inward length 102 of the valve stem shaft 90 to the pressure regulator (82 or 136) of either the FIG. 13 embodiment or the FIG. 14 embodiment. In particular, the inward portion of the valve stem shaft 102 of the modified Schrader valve resides within the air passageway through the valve stem 80. The valve stem shaft 102 is a linkage to the pressure regulator 82 or 136. In embodiment of FIGS. 1 through 13, an electrically powered regulator pressure sensing device 130 is employed, connecting to the valve stem shaft 102 inside the valve stem 80. The pressure sensing device 130 in the regulator 82 measures cavity pressure and controls by signal transmission a regulator magnetic switch 118 to modulate the opening and closing of the valve. In the embodiment of FIGS. 14 and 15, the shaft 102 is coupled to the piston 144 through the ball protrusion 164.

One or both of the tire sidewalls 18, 20 have an elongate sidewall groove formed therein in which an elongate air tube 30 is encased. The air tube 30 has an internal air passageway 32 operatively located to compress segment by segment from an expanded diameter to a substantially reduced diameter responsive to a bending strain introduced into the first sidewall from a rolling tire footprint. A connecting tube 70 extends between the air tube 30 and the valve stem 101, the connecting tube having an internal connecting air passageway for directing air forced along the air tube air passageway into the internal valve stem passageway as the tire rolls over a ground surface. The assembly includes a transfer housing 38 coupling the connecting tube 70 with the air tube 30. A check valve 76 is positioned within the connecting tube 70 to prevent air from the AMT valve stem 80 from flowing backward from the tire cavity to the transfer housing 38. A further one-way check valve 64 mounts to the transfer housing to likewise prevent air from flowing back from the downstream tire cavity. The transfer housing 38 is further provided with a relief valve 62 operative to evacuate air from the transfer housing 38 when an air pressure within the tire cavity exceeds a threshold level. The AMT valve stem 80 is operative in an open position to pass pressurized air from the connecting tube 70 through the axial passageway of the valve stem 80, through the system regulator 82 (or 136 embodiment) and into the tire cavity 28. In the closed position, the regulator 82 or 136 prevents the passage of such air into the cavity.

In summary, it will be appreciated that the subject invention thus constitutes a valve stem-based air maintenance system and method of operation. A pressurized air supply assembly, in the form of the pump assembly 14, is used for supplying pressurized air the tire cavity through the longitudinal passageway through valve stem 80. The valve stem 80 is configured to have an elongate centrally disposed shaft 90 reciprocally moveable axially along a valve stem internal air passageway between a passageway-opening axial position and a passageway-closing axial position. The shaft 90 includes a lower valve stem segment 102 that operates as a linkage between the valve stem 80 and the inward regulator. The pressure regulator 82 is provided to move the elongate shaft 90 (102) axially between the passageway-opening and passageway-closing positions responsive to a detected air pressure level within the tire cavity.

In a powered embodiment of FIG. 13, the pressure regulator 82 includes a pressure measuring sensor 130 for measuring a tire cavity pressure level; a transmitter 134 for transmitting a control signal responsive to the measured tire cavity pressure level; and a valve mechanism 118 for moving the elongate shaft 102 axially between the passageway-opening and passageway-closing positions responsive to the control signal.

It will further be appreciated that he pressure regulator 82 is coupled to an inward end of the elongate shaft 102 in both the powered regulator configuration of FIG. 13 and the passive, or non-powered embodiment of FIG. 14. In the FIG. 13 embodiment, the sealing ring member 112 is mounted to and substantially surrounds the elongate shaft 102 proximate to an inward end. So positioned, the sealing ring member 112 obstructs the valve stem air passageway within the valve stem 80 responsive to an axial movement of the elongate valve shaft 102 to close a flow of air through the valve stem internal air passageway and prevents air from moving into the tire cavity.

The pressure regulator in the FIG. 13 embodiment includes the regulator housing 84 having the enclosed air chamber positioned for pressurized air flow communication with the valve stem internal air passageway. The regulator housing 84 has an annular opening 136 for directing pressurized air from the housing air chamber into the tire cavity and a sealing member 116 mounted to open and close the opening 136 of the regulator housing 84. The sealing member 116 selectively opens and closes the regulator housing opening 136 responsive to a presence and absence of pressurized air within the regulator housing air chamber.

Accordingly, the subject valve stem-based air maintenance tire assembly uses a tire valve stem 80 as part of the air maintenance pumping system. The tire elongate valve stem 80 projects outward in conventional tires from the tire cavity 28 and an internal elongate valve stem air passageway extends through the valve stem 80 in air flow communication with regulator 82 or 136 and, from the regulator, to the tire cavity. According to the invention, a pressure regulator 82, 136 is positioned within the tire cavity opposite an inward end of the valve stem shaft 102 and operates to selectively open and close pressurized air flow from the valve stem internal passageway into the tire cavity. A valve system including piston and check valves is provided in the FIG. 14 embodiment opposite the inward end of the valve stem to selectively control the flow of pressurized air into the tire cavity as needed In the FIG. 14 embodiment, as with the FIG. 13 embodiment, an elongate valve stem shaft 102 is mounted within the valve stem air passageway and reciprocally moves axially between a passageway-opening axial position and a passageway-closing axial position. The valve stem shaft 102 has a sealing mechanism, in the form of ball protrusion 164, at an inward end for closing off the valve stem air passageway with the valve stem shaft in the passageway-closing position. In the regulator valve system of the FIG. 14 embodiment, the reciprocally moving piston 144 and check valve system 154 is incorporated within the regulator housing 138. In the closed position, when air pressure with the tire is at or above recommended levels, the cavity pressure will push the piston 144 into the "closed" position, compressing spring 146. When pressure falls below recommended levels within the cavity, the piston 144 is biased by the spring 146 into the open position. The piston 144, by moving between an open and closed position, moves the valve stem shaft 102 between a corresponding open and closed positions within the valve stem passageway, whereby opening and closing an air flow path through the valve stem passageway and the piston into the tire cavity.

The valve stem 80, as with conventional valve stems used to inflate tires, is sized and configured to extend from the tire through an aperture extending through a rim body 16 supporting the tire. The regulator housing is mounted to a radially inward-facing surface of the rim body 16 by suitable mounting fixture 116. The supply of pressurized air is generated by the tube system 14 shown in FIG. 3, which creates an elongate tire sidewall air passageway. The tube 32 is located within the sidewall to compress segment by segment from an expanded diameter to a substantially reduced diameter responsive to a bending strain introduced into the tire sidewall from a rolling tire footprint. Air forced segment by segment along the sidewall air passageway (tube 32) is directed into a radially outward end of the valve stem passageway via the connecting air passageway tube 70.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An air maintenance tire assembly comprising:
   a tire having a tire cavity bounded by first and second sidewalls extending to a tire tread region;
   air pumping means for generating pressurized air for maintaining air pressure within the tire cavity at a preset pressure level;
   the tire having an elongate valve stem projecting outward from the tire cavity and operative to admit pressurized air into the cavity through a valve stem internal air passageway;
   an elongate shaft having an longitudinal axis, the shaft reciprocally moveable axially within the valve stem internal air passageway between a passageway-opening axial position and a passageway-closing axial position;
   a pressure regulator operative to move the elongate shaft axially between the passageway-opening and passageway-closing positions responsive to a detected air pressure level within the tire cavity;
   wherein the pressure regulator comprises:
   a pressure measuring sensor for measuring a tire cavity pressure level;
   transmission means for transmitting a control signal responsive to the measured tire cavity pressure level; and
   valve means for moving the elongate shaft axially between the passageway-opening and passageway-closing positions responsive to the control signal.

2. An air maintenance tire assembly comprising:
   a tire having a tire cavity bounded by first and second sidewalls extending to a tire tread region;
   air pumping means for generating pressurized air for maintaining air pressure within the tire cavity at a preset pressure level;
   the tire having an elongate valve stem projecting outward from the tire cavity and operative to admit pressurized air into the cavity through a valve stem internal air passageway;
   an elongate shaft having an longitudinal axis, the shaft reciprocally moveable axially within the valve stem internal air passageway between a passageway-opening axial position and a passageway-closing axial position;
   a pressure regulator operative to move the elongate shaft axially between the passageway-opening and passageway-closing positions responsive to a detected air pressure level within the tire cavity,
   wherein the pressure regulator is coupled to an inward end of the elongate shaft.

3. The air maintenance tire assembly of claim 2, wherein further comprising a sealing ring member mounted to and substantially surrounding the elongate shaft proximate to an inward end of the elongate shaft, the sealing ring member substantially obstructing the valve stem air passageway within the valve stem responsive to an axial movement of the elongate valve shaft to close a flow of air through the valve stem internal air passageway.

4. The air maintenance tire assembly of claim 2, wherein the regulator further comprises:
   a regulator housing having an enclosed air chamber positioned for air flow communication with the valve stem internal air passageway, the regulator housing air chamber operative to receive pressurized air from the valve stem internal air passageway;
   a regulator housing opening for directing pressurized air from the regulator housing chamber into the tire cavity; and
   a moveable regulator housing sealing member mounted to the regulator housing and operative to selectively open and close the regulator housing opening responsive to a presence and absence of pressurized air within the regulator housing air chamber.

5. The air maintenance tire assembly of claim 2, wherein the valve stem is sized and configured to extend from the tire through an aperture extending through a rim body supporting the tire; and the regulator housing having mounting means operative to mount the regulator housing to an inward-facing surface of the rim body.

6. The air maintenance tire assembly of claim 5, wherein the air pumping means comprises:
   a first sidewall of the tire having an elongate sidewall air passageway therein operatively located to compress segment by segment from an expanded diameter to a substantially reduced diameter responsive to a bending strain introduced into the first sidewall from a rolling tire footprint; whereby forcing air segment by segment along the sidewall air passageway; and
   a connecting air passageway connected at opposite ends with the sidewall air passageway and with the valve stem internal air passageway, the connecting air passageway operative to direct air forced along the sidewall air passageway into the valve stem internal passageway as the tire rolls over a ground surface.

7. The air maintenance tire assembly of claim 2, wherein the air pumping means comprises:
   a first sidewall of the tire having an elongate sidewall air passageway therein operatively located to compress segment by segment from an expanded diameter to a substantially reduced diameter responsive to a bending strain introduced into the first sidewall from a rolling tire footprint; whereby forcing air segment by segment along the sidewall air passageway; and
   a connecting air passageway connected at opposite ends with the sidewall air passageway and with the valve stem internal air passageway, the connecting air passageway operative to direct air forced along the sidewall air passageway into the valve stem internal passageway as the tire rolls over a ground surface.

8. An air maintenance tire assembly comprising:
   a tire having a tire cavity bounded by first and second sidewalls extending to a tire tread region;
   air pumping means for generating pressurized air for maintaining air pressure within the tire cavity at a preset pressure level;
   the tire having an elongate valve stem projecting outward from the tire cavity and operative to admit pressurized air into the cavity through a valve stem internal air passageway;
   an elongate shaft having an longitudinal axis, the shaft reciprocally moveable axially in a radial direction within the valve stem internal air passageway between a passageway-opening axial position and a passageway-closing axial position;
   a pressure regulator operative to move the elongate shaft axially between the passageway-opening and passageway-closing positions responsive to a detected air pressure level within the tire cavity;

wherein the pressure regulator comprises a regulator housing coupled to a radially inward end of the elongate shaft and positioned to receive air flow from the valve stem internal air passageway within an internal regulator housing chamber;

and wherein the pressure regulator having valve means for moving the elongate shaft axially between the passageway-opening and the passageway-closing positions responsive to the detected air pressure level within the tire cavity.

9. The air maintenance tire assembly of claim 8, wherein the pressure regulator further comprises:

a pressure measuring sensor for measuring a tire cavity pressure level;

transmission means for transmitting a control signal to the valve means responsive to the measured tire cavity pressure level; and wherein the control signal is operable to switch the valve means between open and closed positions.

10. The air maintenance tire assembly of claim 8, wherein the regulator housing comprises:

a regulator housing opening for directing pressurized air from the regulator housing chamber into the tire cavity; and a moveable regulator housing sealing member mounted to the regulator housing and operative to selectively open and close the regulator housing opening responsive to a presence and absence of pressurized air within the regulator housing air chamber.

11. The air maintenance tire assembly of claim 8, wherein the valve stem is sized and configured to extend from the tire through an aperture extending through a rim body supporting the tire; and the regulator housing having mounting means operative to mount the regulator housing to an inward-facing surface of the rim body.

12. The air maintenance tire assembly of claim 11, wherein the air pumping means comprises:

a first sidewall of the tire having an elongate sidewall air passageway therein operatively located to compress segment by segment from an expanded diameter to a substantially reduced diameter responsive to a bending strain introduced into the first sidewall from a rolling tire footprint; whereby forcing air segment by segment along the sidewall air passageway; and a connecting air passageway connected at opposite ends with the sidewall air passageway and with the valve stem internal air passageway, the connecting air passageway operative to direct air forced along the sidewall air passageway into the valve stem internal passageway as the tire rolls over a ground surface.

* * * * *